April 16, 1963 J. A. STOHR ETAL 3,085,954
FUEL ELEMENT FOR AN ATOMIC REACTOR
Filed June 26, 1959 2 Sheets-Sheet 2

United States Patent Office 3,085,954
Patented Apr. 16, 1963

3,085,954
FUEL ELEMENT FOR AN ATOMIC REACTOR
Jacques André Stohr, Bures-sur-Yvette, and Maurice Gauthron, Paris, France, assignors to Commissariat a l'Energie Atomique, Paris, France
Filed June 26, 1959, Ser. No. 823,221
Claims priority, application France July 7, 1958
3 Claims. (Cl. 204—154.2)

In heterogeneous atomic reactors, the fuel generally takes the form of small pellets or small bars. These small pellets of uranium, uranium oxide or uranium carbide are enclosed in a sheath which imparts satisfactory mechanical properties to the whole, and insulates the fuel from the cooling fluid flowing through the moderator ducts in which it is situated.

The mechanical conditions to which the sheath is subjected are at present met by increasing its thickness, which unfortunately involves additional absorption of neutrons, and impairs heat transfer.

According to the present invention there is provided a method of producing a fuel element for a nuclear reactor comprising forming a series of fuel pellets in which the external diameter of alternate pellets is greater than the external diameter of the other pellets, enveloping the series of pellets in a sheath and deforming the sheath to hold each of the pellets relative to its adjacent pellets.

Plastic deformation may, for example, be caused by hydrostatic pressure when hot or cold, according to the properties of the sheathing metal (aluminium, zircalloy, stainless steel etc.); the fuel itself serves as a mandrel. The basic pellets must first of all be centered in order to impart a satisfactory appearance to the fuel element.

The fuel element structure to which the invention relates is simple to put into practice, and enables the most varied final shapes to be obtained from a sheath which starts by being smooth, such shapes imparting to the element better mechanical properties, for a given sheath thickness, than it would have if it were smooth, and furthermore preventing the oxide pellets from being displaced with respect to the sheath.

Experiments carried out on tubes of various diameters have shown that there is a limit to the variation in diameter above which fitting the sheath causes local buckling leading to longitudinal folds which may be accurately reproduced, and whereof the number depends in general upon the material, thickness and diameter of the sheath.

These longitudinal folds stiffen the element, and enable the thickness to be further reduced for given mechanical properties.

The sheath which has had its thickness reduced absorbs fewer neutrons, and allows of better heat transfer. In addition, certain corrugations which are produced at the time of plastic deformation increase the area of contact with the cooling fluid. The said deformation also encourages contact between the sheath and the fuel, and heat transfer is therefore further improved.

In order that the present invention may be well understood there will now be described some embodiments thereof, given by way of example only, reference being had to the accompanying drawings, in which.

Figure 1:
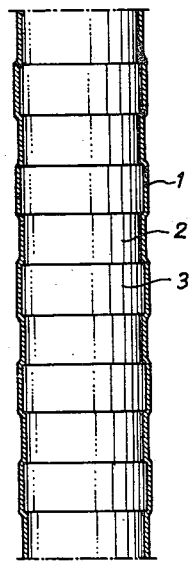
FIGURE 1 is an elevation of an element according to the invention.

FIGURE 1 shows the sheath 1 and the basic fuel pellets 2 and 3 of different diameters.

Figure 2:
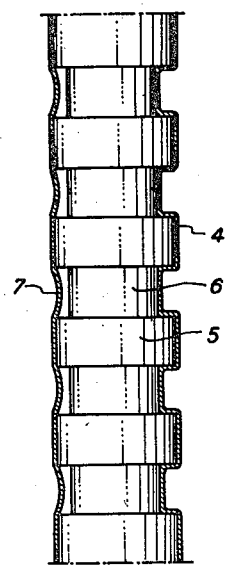
FIGURE 2 is an elevation of a second element according to the invention.
Figure 3:
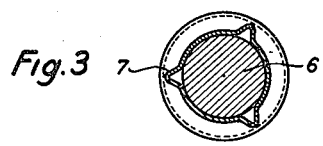
FIGURE 3 illustrates a section perpendicular to the axis of the said second element.

FIGURES 2 and 3 show an embodiment which makes clear how the longitudianl folds are obtained.

With a stainless steel sheath such as 4, having an internal diameter of 13 mm. and a thickness of 1 mm., the limiting value of the difference in diameter between the two types of pellets above which fitting the sheath causes buckling is 1 mm.: if pellets having diameters of 13 mm. and 12 mm. are stacked, the sheath makes a perfect fit after having been placed in position on the mandrel formed by the fuel. If pellets such as 5, having a diameter of 13 mm., and such as 6, having a diameter of 11 mm. (greater difference than 1 mm.), are stacked, buckling causes longitudinal folds 7.

Figure 4:
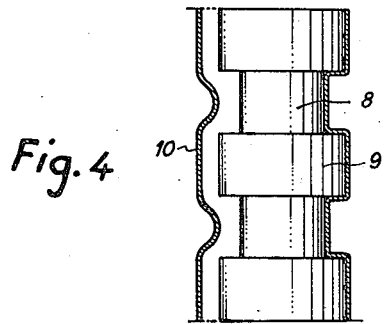
FIGURE 4 is an elevation of a third element according to the invention.
Figure 5:
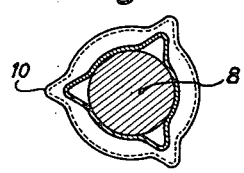
FIGURE 5 illustrates a section perpendicular to the axis of the said third element.

FIGURES 4 and 5 show basic fuel pellets 8 and 9 of different diameters. The initial diameter of the sheath was greater than that of the large-diameter pellets 9, and the difference between these two diameters exceeded the limiting value above which fitting the sheath causes buckling. The latter occurs not only opposite to the small-diameter pellets, but also opposite to the large-diameter pellets. The folds 10 run all along the element, and stiffen it much more completely.

The folds were started by first passing the sheath into a die, and this can also faciiltate centering.

Figure 6:
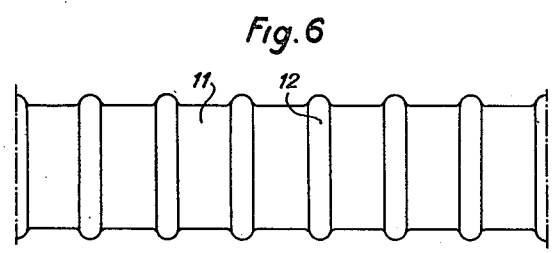
FIGURES 6 and 7 illustrate other elements according to the invention.
Figure 7:
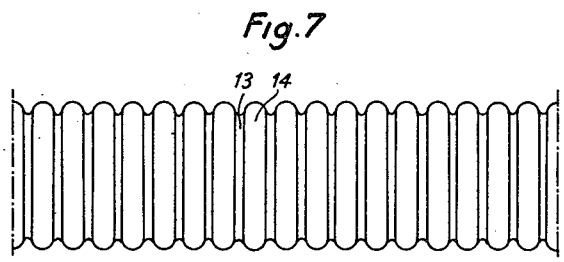

In FIGURES 6 and 7, the two types of basic pellets are not of the same length; in FIGURE 6 the small-diameter pellets 11 are longer than the large-diameter rods 12. In FIGURE 7, the small-diameter pellets 13 are shorter than the large-diameter pellets 14.

We claim:

1. A fuel element for an atomic reactor having good mechanical rigidity and good heat transfer properties, a plurality of axially disposed first fuel pellets, second fuel pellets of smaller diameter than and alternatively and axially arranged with respect to and in contact with said first fuel pelets and a steel sheath surounding and engaging all of said pellets.

2. A fuel element as described in claim 1 in which said fuel pellets vary in diameter from 11 mm. to 13 mm. with a difference in diameter between said first pellets and said second pellets of approximately 1 mm., and folds in said sheat longitudinally disposed with respect thereto and adjacent said second pellets.

3. A fuel element as described in claim 1 in which said fuel pellets vary in diameter from 11 mm. to 13 mm. with a difference in diameter between said first pellets and said second pellets of approximately 1 mm. and folds extending longitudinally of and over substantially the length of said sheath.

References Cited in the file of this patent

UNITED STATES PATENTS

| | | |
|---|---|---|
| 341,794 | Burkhard | May 11, 1886 |
| 434,196 | McClure et al. | Aug. 12, 1890 |
| 609,947 | Pusey | Aug. 30, 1898 |
| 663,896 | Herr | Dec. 18, 1900 |
| 868,895 | Stephenson | Oct. 22, 1907 |
| 1,169,642 | Heeter | Jan. 25, 1916 |
| 2,375,741 | Dibner | May 8, 1945 |
| 2,576,528 | Matthysse | Nov. 27, 1951 |
| 2,848,800 | Maloney et al. | Aug. 26, 1958 |
| 2,856,340 | Wigner et al. | Oct. 14, 1958 |
| 2,907,705 | Blainey | Oct. 6, 1959 |

FOREIGN PATENTS

| | | |
|---|---|---|
| 789,257 | Great Britain | Jan. 15, 1958 |
| 794,614 | Great Britain | May 7, 1958 |